(12) United States Patent
Berenbaum

(10) Patent No.: US 6,917,589 B2
(45) Date of Patent: Jul. 12, 2005

(54) AUTOMATIC QUALITY OF SERVICE ASSIGNMENT IN ETHERNET SWITCHES

(75) Inventor: Alan D. Berenbaum, New York City, NY (US)

(73) Assignee: Agere Systems Inc., Allentown, PA (US)

( * ) Notice: Subject to any disclaimer, the term of this patent is extended or adjusted under 35 U.S.C. 154(b) by 874 days.

(21) Appl. No.: 09/768,592

(22) Filed: Jan. 25, 2001

(65) Prior Publication Data

US 2002/0097679 A1 Jul. 25, 2002

(51) Int. Cl.[7] .............................................. H04L 12/26
(52) U.S. Cl. .................. 370/232; 370/395.42; 370/429
(58) Field of Search ................................ 370/229–230, 370/235, 252–253, 352–354, 401, 412, 236, 395.42, 417, 428, 429

(56) References Cited

U.S. PATENT DOCUMENTS

| | | | | |
|---|---|---|---|---|
| 5,926,458 A | * | 7/1999 | Yin | 370/230 |
| 6,233,245 B1 | * | 5/2001 | Chapman et al. | 370/412 |
| 2002/0075803 A1 | * | 6/2002 | Zaharychuk et al. | 370/231 |
| 2004/0081093 A1 | * | 4/2004 | Haddock et al. | 370/230 |

* cited by examiner

Primary Examiner—Chi Pham
Assistant Examiner—Rhonda Murphy

(57) ABSTRACT

An automatic, adaptive voice/data Ethernet device with automatic assignment of quality of service is disclosed. When a "short" packet arrives (where short can be a default value or a configured value, if desired), it is tagged and a table is searched based upon the packet's information. If there is no table entry, the packet's arrival time and size are entered into the table. If a table entry is found, a new interval is calculated by subtracting the last arrival time from the tagged value. If the new interval is approximately the same as the old interval, then the packet is sent to the appropriate output queue. If the new interval time is different than the old interval, the interval value is cleared. The present invention can improve the quality of service by reducing jitter. Each time a packet arrives and is determined to be part of a high priority packet flow, the expected arrival time of the next high priority packet is calculated and inserted into a sorted list of expected arrival times associated with destination output queues. At the output queues, a low priority packet can be held up if its completion time would be later than the next expected arrival time at the head of the arrival time list. In this manner, high priority packets that have not yet arrived will not be blocked by long low priority packets that have already started.

22 Claims, 7 Drawing Sheets

*FIG. 3*

| 201 | 202 | 203 | 204 | 205 | 206 |
|---|---|---|---|---|---|
| SOURCE/DEFINITION | PACKET SIZE | TIMESTAMP OF LAST MOST RECENT ARRIVAL | DATA PERIOD | DATA RATE | NEXT ARRIVAL TIME |
| | | | | | |

AUTOMATIC QUALITY OF SERVICE ASSIGNMENT IN ETHERNET SWITCHES

BACKGROUND OF THE INVENTION

1. Field of the Invention

This invention relates generally to Ethernet devices. More particularly, it relates to an efficient and cost effective manner of automatically assigning a quality of service to an Ethernet packet.

2. Background

Ethernet is a widely-installed local area network (LAN) technology. Using an Ethernet interface, many computer devices can communicate with one another over a LAN. Ethernet is specified in a well known standard, IEEE 802.3.

An Ethernet LAN typically uses twisted pair wires or coaxial cable. The most commonly installed Ethernet systems are called 10Base-T and provide transmission speeds up to 10 megabits per second (MBPS). Fast Ethernet, or 100Base-T, provides transmission speeds up to 100 Mbps.

Ethernet devices can transmit packets using a wide range of packet sizes, e.g. from 60 bytes up to 1514 bytes. Ethernet uses a wide range of packet sizes because it is intended for data streams.

Recently there has been growing interest in converging additional types of traffic, e.g., voice stream traffic on a single infrastructure such as an Ethernet network. Converging voice and data traffic allows for lower costs while optimizing network utilization.

However, data streams and voice streams have different characteristics. Data streams tend to use large packets which are transmitted at relatively high, variable data rates, e.g., greater than 400 bytes and 100–400 kbps. Data streams also tend to transmit data packets in "bursts" at random times.

Unlike data streams, voice streams tend to use "short" packets which are transmitted at a relatively low constant bit rate, e.g., less than 400 bytes and less than 100 kbps.

In order to provide telephony (i.e. voice) services that approximate traditional telephones over a network, voice streams containing voice information must be handled differently than data streams.

FIG. 6 shows conceptually how a conventional Ethernet device may handle a voice stream and data stream at the same time. A conventional Ethernet device 600 provides a high priority queue 604 and a low priority queue 605. Packets in the high priority queue 604 are processed preferentially over packets in the low priority queue 605.

Input stream 610 includes a low priority data packet 603 which arrives first at Ethernet device 600, a voice stream comprised of voice packets 601a and 601b, and a high priority data packet 602. Voice packets 601a and 601b and high priority data packet 602 are directed to the high priority queue 604. Low priority data packet 603 is directed to the low priority queue 605.

Output stream 611 illustrates how the Ethernet device 600 preferentially processes packets in the high priority data queue 604. Although low priority data packet 603 arrived first, the low priority data packet 603 is transmitted last in the output stream as output packet 609. Voice packets 601a and 601b and high priority data packet 602 are transmitted preferentially as output packets 607a, 608, and 607b respectively.

Conventional Ethernet devices generally direct packets to a particular priority queue by evaluating their MAC addresses, by using the 802.1protocol, or by inspecting the contents of the Ethernet packet and evaluating the higher-level protocols contained inside. In particular, the IEEE has extended the Ethernet protocol via 802.1p to add a field that explicitly assigns packets to priority queues.

FIG. 7 shows a more detailed view of a typical Ethernet device which provides multiple priority queues.

In particular, as shown in FIG. 7, a conventional Ethernet device 500 includes an input queue 501, and input controller 502 with an explicit configuration 504, a series of output queues 503 to 503n, an ouput controller 505, and a transmit queue 506.

The input queue 501 receives incoming data packets and buffers them until they are evaluated by the input controller 502.

The input controller 503 interrrogates packets buffered in the input queue 501 and evaluates their contents (i.e. MAC address). The input controller 502 typically uses explicit configuration 504 to decide which output queue (i.e. output queues 503 to 503n) to forward the packet.

Output queues 503–503n allow a packet to be buffered until it is serviced by the output controller 505. The output controller 505 prepares the packet for transmission and forwards the packet to the transmit queue 506.

Packets in the transmit queue 506 are then transmitted to the Ethernet LAN 507.

Unfortunately, conventional Ethernet devices require a complex explicit configuration to provide multiple priorities. Explicit configurations require trained personnel to design the settings and to enter them into the conventional Ethernet device.

The Ethernet network could perhaps implement the 802.1p priority mechanism. However, for the 802.1p mechanism to work properly, all end points in the network must include software that is 802.1p-aware, which is capable of accessing the 802.1p mechanism in the network, and all Ethernet switches in the network must be 802.1p compliant for the packets to propagate correctly through the network.

Maintaining a staff of trained personnel is difficult for small or medium sized organizations which often do not even have a full-time network manager.

Furthermore, an explicit configuration must continually be updated by a trained person whenever a change occurs in the Ethernet LAN. Thus, conventional Ethernet devices which require explicit configurations are difficult to maintain and prone to errors.

Accordingly, there is a need for a technique and device which provides the quality of service available in an explicitly-managed device, without requiring trained personnel to manually configure and maintain the Ethernet device.

SUMMARY OF THE INVENTION

In accordance with the principles of the present invention, an automatic, adaptive voice/data device, comprises a high priority transmission queue; a low priority transmission queue. A data rate detector detects a data rate of a data stream from a particular source. A periodicity detector detects a periodicity between data packets from the particular source. The data packets are provided to the high priority transmission queue and the low priority transmission queue based on their data rate and periodicity.

In accordance with another aspect of the present invention, a method of automatically assigning a quality of service in an automatic, adaptive voice/data device, comprises identifying a data flow from a particular source. A data rate of the data flow is determined. A periodicity of a receipt of packets in the data flow is determined. A particular Quality of Service is assigned based on the data rate and periodicity.

In accordance with another aspect of the present invention, a method of optimizing a quality of service in an automatic, adaptive voice/data device, comprises identifying a high priority packet in a data flow based solely on a history of packets received from a same source. An expected next arrival time of a next high priority packet in the data flow is calculated. It is determined whether a pending low priority packet interferes with a transmission of the next high priority packet in the data flow. The high priority packet is forwarded in the data flow.

BRIEF DESCRIPTION OF THE DRAWINGS

Features and advantages of the present invention will become apparent to those skilled in the art from the following description with reference to the drawings, in which:

FIG. 3 is a detailed exemplary drawing of a QoS table, in accordance with the principles of the present invention.

DETAILED DESCRIPTION OF ILLUSTRATIVE EMBODIMENTS

The present invention allows automatic quality of service assignment in an automatic, adaptive voice/data Ethernet device in order to provide voice telephony services. Moreover, priority queuing is accomplished in a way that does not require the entire network to be 802.1p compliant.

Figure 1:
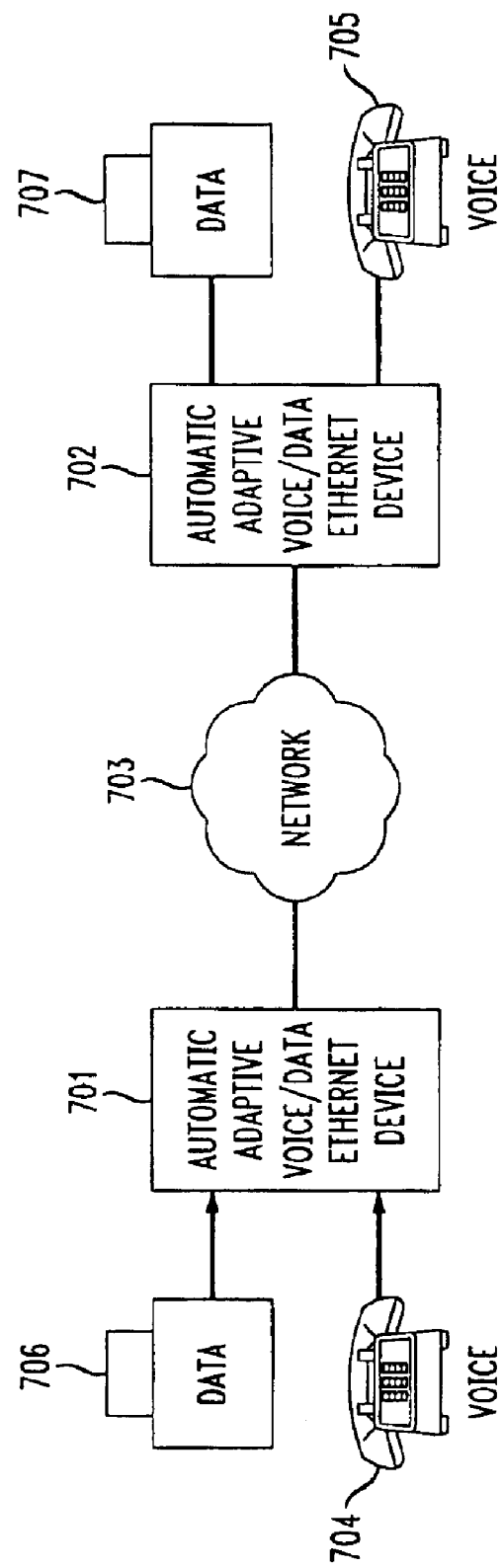
FIG. 1 shows an exemplary topology for providing voice services over an Ethernet network, in accordance with the principles of the present invention.

FIG. 1 shows an exemplary topology for providing automatic, adaptive voice services using Ethernet devices.

In particular, one or more voice device(s) 704 (e.g., a telephone) may be coupled to an automatic, adaptive voice/data Ethernet device 701 in accordance with the principles of the present invention. One or more data device(s) 706 such as a personal computer may be coupled to automatic, adaptive voice/data Ethernet device 701.

The automatic, adaptive voice/data Ethernet device 701 is connected via network 703 to a complementary automatic, adaptive voice/data Ethernet device 702. Network 703 is a conventional network (e.g., the Internet) which can support both voice and data traffic.

One or more second voice device(s) 705 may be connected to the complementary automatic, adaptive voice/data Ethernet device 702. One or more data device(s) 707 may also be connected to automatic, adaptive voice/data Ethernet device Ethernet device 702.

In a manner similar to the way conventional Ethernet devices "learn" media access control ("MAC") addresses, automatic, adaptive voice/data Ethernet devices 701 and 702 learn which incoming data streams are likely to be voice streams, and assigns high priority to such presumed data streams without requiring explicit user management to configure the device.

Streams from voice devices 704 and 705 will be relatively constant bit rate with fixed-size packets arriving at the automatic, adaptive voice/data Ethernet devices 701 and 702 with constant source addresses and constant destination addresses. Voice streams can be distinguished from data streams (such as those originating from data devices 706 and 707) automatically and adaptively by the automatic, adaptive voice/data Ethernet devices 701 and 702 and assigned an appropriate quality of service. Thus, streams from voice devices 704 and 705 via the automatic, adaptive voice/data Ethernet devices 701 and 702 can approximate traditional voice telephony without requiring user management.

Figure 2:
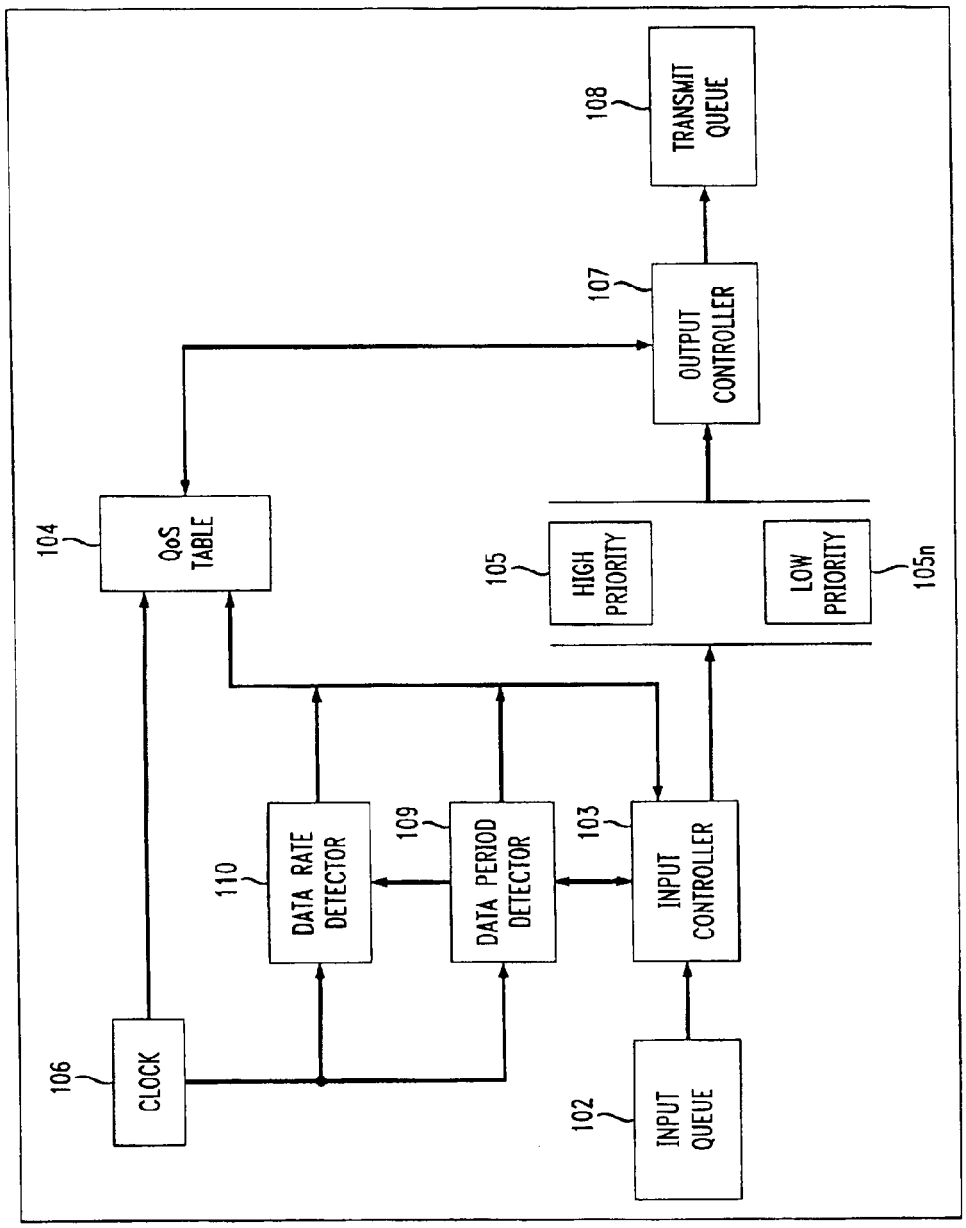
FIG. 2 shows an automatic, adaptive voice/data Ethernet device including a quality of service ("QoS") allowing for automatic quality of service assignment, in accordance with the principles of the present invention.

FIG. 2 shows a more detailed depiction of an exemplary embodiment of an automatic, adaptive voice/data Ethernet device 701 and 702 which can provide voice telephony services without requiring explicit user management.

In particular, as shown in FIG. 2, automatic, adaptive voice/data Ethernet device 701 includes an input queue 102, an input controller 103, a data period detector 109, a data rate detector 110, output queues 105 and 105n, an output controller 107, a transmit queue 108, a QoS table 104, and a clock 106.

The input queue 102 buffers packets as they arrive at the Ethernet device 701. While in the input queue 102, the packets are interrogated by the input controller 103.

The input controller 103 interrogates packets in the input queue 102 to determine if it is part of a particular stream (e.g. a voice stream). For example, the input controller 103 may identify a voice stream by constancy of it's source address and destination address of a packet.

The input controller 103 then refers to the data period detector 109, data rate detector 110 and QoS table 104 to determine if a packet is part of a voice stream or data stream based on rate and periodicity and forwards the packet to the appropriate output queue 105 and 105n. The data period detector 109 detects a consistency of periodicity between data packets from a particular source (e.g. voice device 704 and 705). Upon detecting a consistency of periodicity, the data period detector 109 creates and/or modifies an entry in the QoS table 104. Preferably, the data period detector 109 detects a consistency of periodicity by continually calculating the data period between the time stamps of data packets with a constant source address. However, any method of detecting a relatively constant periodicity from a particular source is within the principles of the present invention.

The data rate detector 110 determines the data rate of data streams identified by the data period detector 109 as having a consistency of periodicity. The data rate detector 110 then creates and/or modifies an entry in the QoS table 104. Preferably, the data rate detector calculates data rate by dividing the packet size of a particular packet by the data period detected by the data period detector 109.

Output queues 105 and 105n and the output controller 107 operate in conjunction to provide multiple priorities within the Ethernet device 701. For example, output queue 105 may correspond to "high" priority traffic (e.g. voice packets in a voice stream) while output queue 105n may correspond to "low" priority traffic (e.g. data packets in a data stream for a file transfer). Multiple levels of priority in addition to "high" and "low" are within the principles of the present invention.

The output controller 107 decides which output queue to forward the packet in order to maintain a particularly desired quality of service.

The output controller 107 may service the output queues 105 and 105n by a wide variety of algorithms known by those skilled in the art. Preferably, the output controller 107 treats a voice stream as constant bit rate quality of service which is preferentially serviced over most other types of traffic. However, the principles of the present invention apply to any type of multiple priority queuing algorithm or multiple quality of service algorithm.

The output controller 107 then forwards the packet to the transmit queue 108. The transmit queue 108 prepares the packet for transmission by a wide variety of ways known by those of ordinary skill in the art, e.g., adding framing bits and redundancy bits.

FIG. 3 shows an exemplary embodiment of the QoS table 104 of the present invention. Each QoS table entry includes a source/destination pair column 201, a packet size column 202, a timestamp of the last most recent arrival column 203, a data period interval column 204, a data rate column 205, and a next arrival time column 206.

The source/destination pair column 201 identifies a table entry's source address and destination address. Preferably, Ethernet MAC Source address and destination address pairs are used. However, any unique address pair combination, e.g., IP addresses or TCP ports may also be used in accordance with the principles of the present invention.

The packet size column 202 notes a packet size for a table entry. Preferably, the packet size column 202 notes packet size in byte units. However, other units of measure to note the size of a packet in a stream may be used in accordance with the principles of the present invention.

The timestamp column 203 notes the time of arrival of the last most recent packet arrival for a particular table entry.

The data period column 204 preferably notes the periodicity between the time of arrival of the last most recent packet arrival and the time of arrival of the current packet being processed by the data period detector 109.

The data rate column 205 notes the data rate of a table entry detected by the data rate detector 110. Preferably, the data rate detector 110 calculates data rate by dividing the current packet's size by the data period detected by the data rate detector 109. However, other methods of calculating data rate are within the principles of the present invention.

The next arrival time column 206 notes the next expected arrival time of the next packet within the data stream. Preferably, the next arrival time is calculated by adding the value in the timestamp of the last most recent arrival column 203 with the value in the data period column 204.

The QoS table 104 and columns 201–206 may be treated as a cache, so entries that are no longer in use are eventually purged after a set or default period of time. Preferably, QoS table entries are sorted according to ascending value (i.e., from soonest to latest) in the next arrival time column 206 and purged as the clock value progresses past successive next arrival times in column 206.

Figure 4:
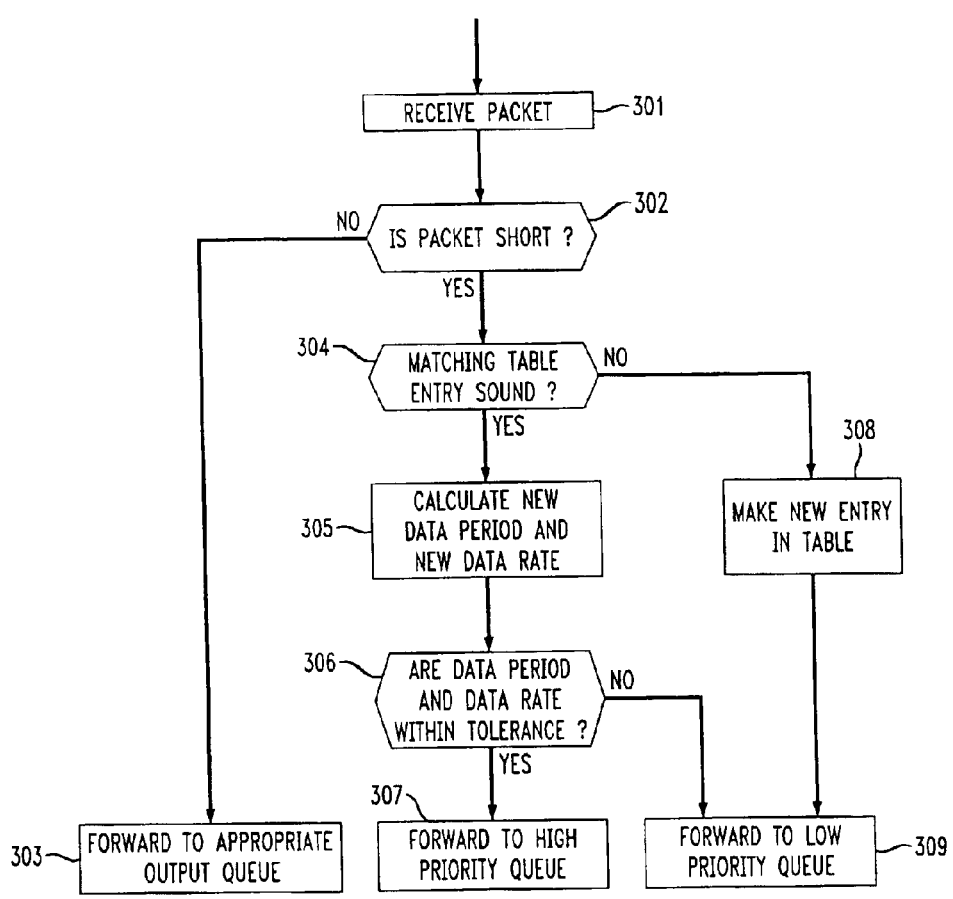
FIG. 4 shows how automatic quality of service assignment is performed at the input side of an automatic, adaptive voice/data Ethernet device, in accordance with the principles of the present invention.

FIG. 4 shows how automatic quality of service assignment may be performed at the input side of an automatic, adaptive voice/data Ethernet device 701 and 702, in accordance with the principles of the present invention.

In particular, in step 301 automatic, adaptive voice/data Ethernet device 701 receives an incoming Ethernet packet.

Preferably, the Ethernet packet is received into the input queue 102. The Ethernet packet is then interrogated by the input controller 103. The Ethernet packet may be interrogated by a wide variety of ways known by those of ordinary skill in the art.

Preferably, the Ethernet packet is interrogated for its MAC source and destination addresses. However, other information (e.g., IP addresses and/or TCP ports) from the packet may be used to identify a stream in accordance with the principles of the present invention.

In step 302, the input controller 103 determines if the Ethernet packet is "short".

A "short" packet may be defined according to a default value or a configured value. Preferably, a "short" packet is a packet less than 120 bytes. However, other values for a "short" packet suited for voice traffic may be used in accordance with the principles of the present invention.

In step 303, if the packet is not "short", e.g., larger than 120 bytes, then the input controller forwards the packet to output queue 105–105n according to the priority assigned to the packet (e.g. the priority assigned by data device 706 and 707).

In step 304, if the packet is "short", e.g., less than 120 bytes then the input controller 103 determines whether the packet has a matching source/destination pair entry in column 201 in the QoS table 104.

Preferably, the input controller 103 matches the packet to an entry in the QoS table 104 based upon the packet's MAC source and MAC destination addresses. However, other information (e.g., IP addresses and/or TCP ports) from the packet may be used in accordance with the principles of the present invention.

In step 308, if no matching table entry is found, then this indicates a possible new stream and the input controller 103 makes a new table entry in the QoS table 104.

In step 309, the packet is forwarded to low priority output queue 105n.

In step 305, if the packet matches a table entry in QoS table 104 then the data period detector 109 calculates a new data period by comparing the timestamp of the most recent arrival found in column 203 with the timestamp of the current packet. In addition, the data rate detector 110 calculates a new data rate by dividing the packet size of the current packet by the new data period detected by the data period detector 109.

In step 306, the new data period and new data rate are compared to the values in the data period column 204 and in the data rate column 205 to determine if they are within a certain tolerance consistent with a voice stream.

The tolerance is set or defaulted to ensure that overall delay between voice devices 704 and 705 does not exceed, e.g., 10 milliseconds and that overall data rate is relatively low, e.g., less than 100 kbps. However, any tolerance value which ensures a voice quality that approximates traditional voice telephony is within the principles of the present invention.

In step 307, if the values are within the tolerance (e.g., the packet is part of a voice stream), then the packet is forwarded to the high priority output queue 105.

In step 309, if the values are not within the tolerance (e.g., the packet is part of a data stream), then the packet is forwarded to low priority output queue 105n.

Figure 5:
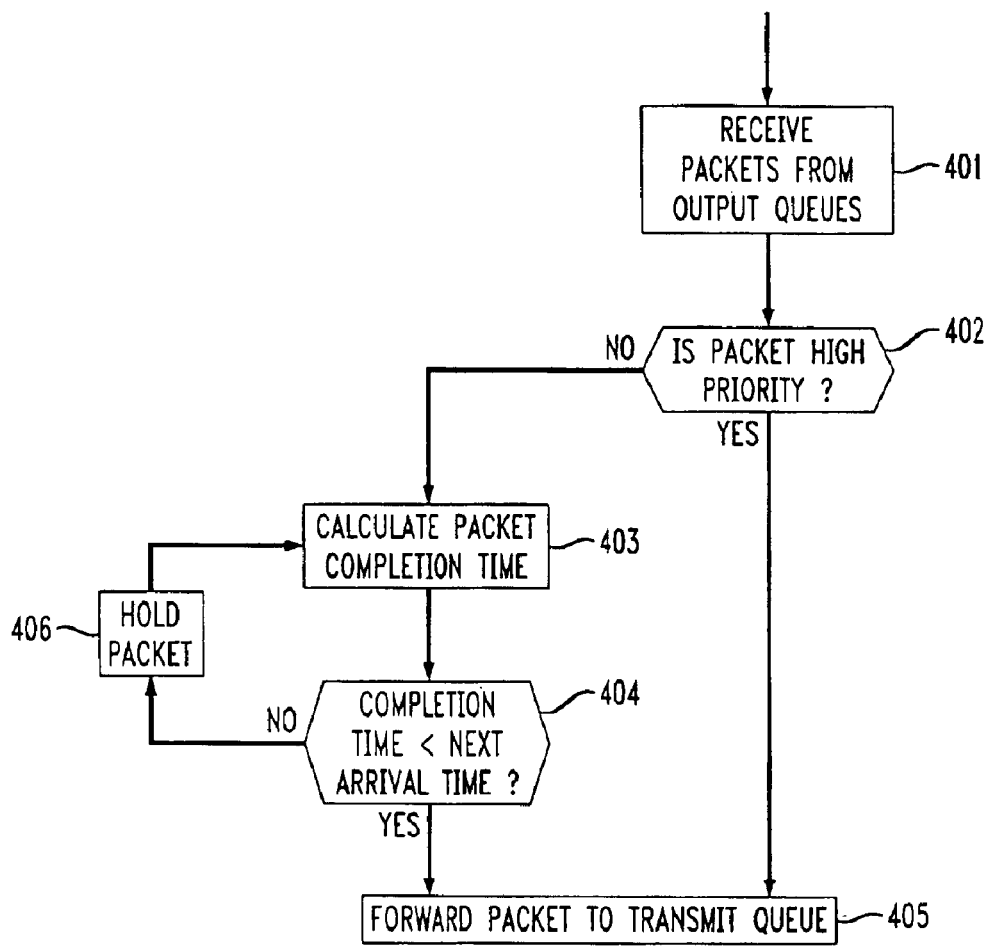
FIG. 5 shows how automatic quality of service optimization is performed at the output side of an automatic, adaptive voice/data Ethernet device, in accordance with the principles of the present invention.
Figure 6:
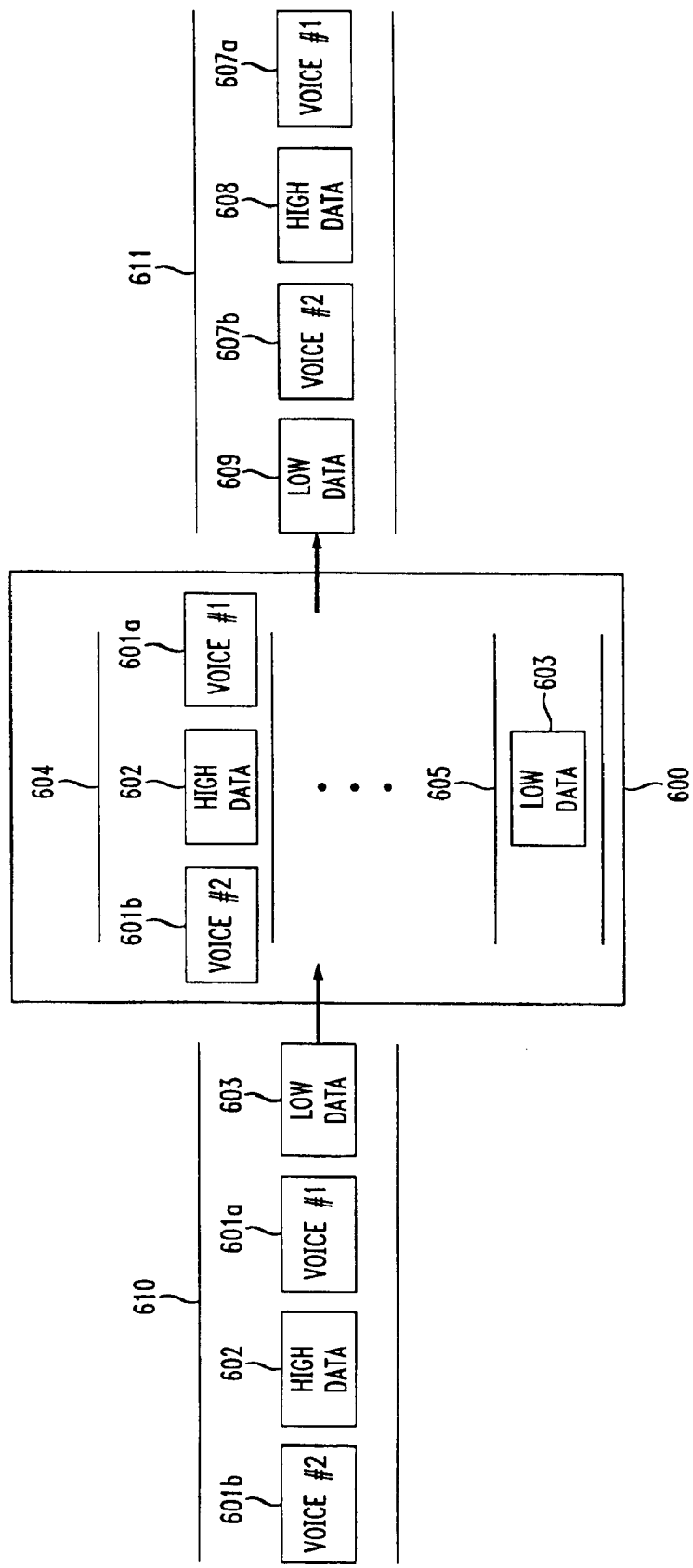
FIG. 6 shows a conventional Ethernet device which uses an explicit configuration to handle simultaneous data streams, voice streams and multiple priority queues.
Figure 7:
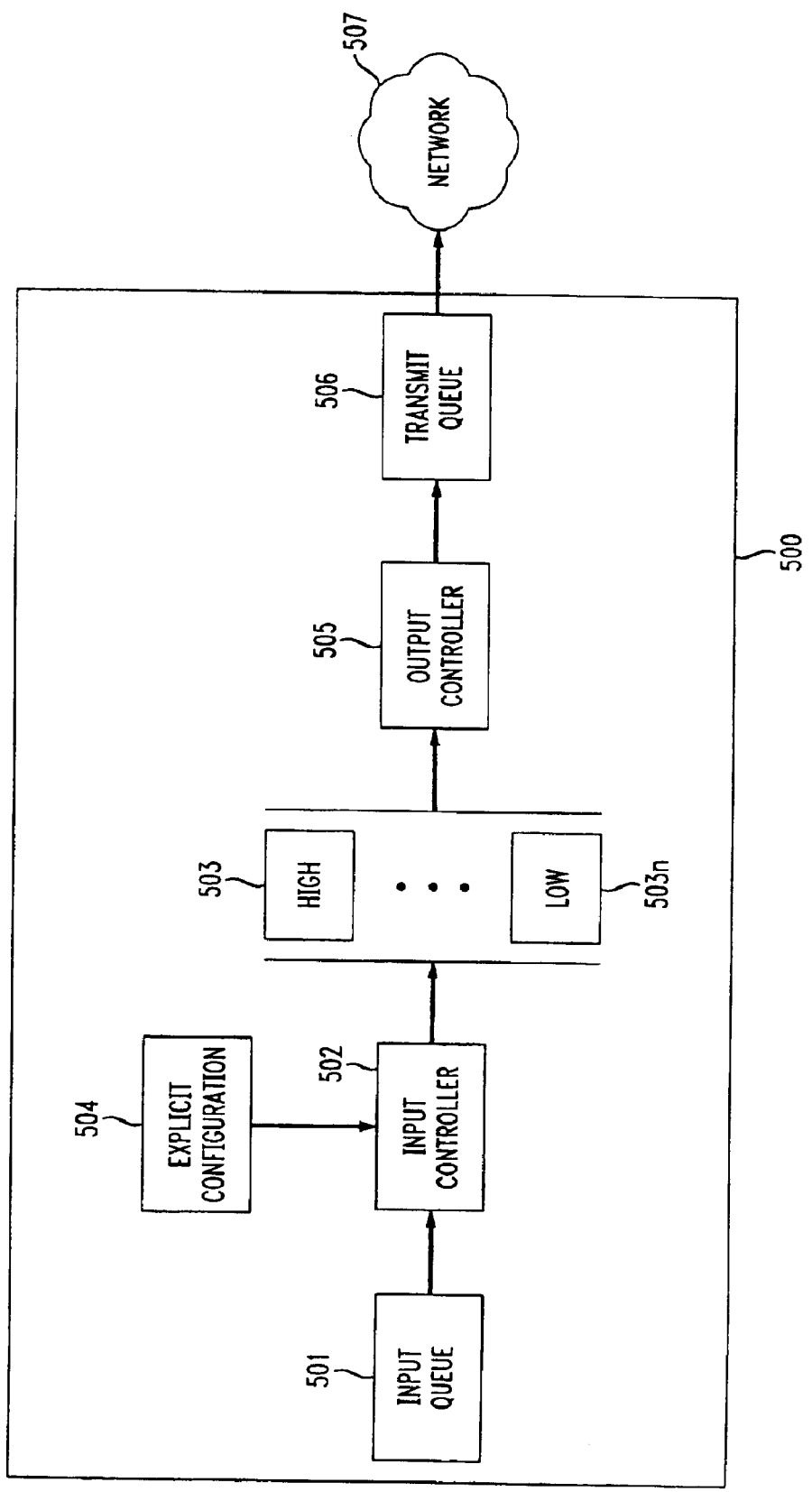
FIG. 7 shows a conventional Ethernet device including a plurality of output queues with multiple priorities.

FIG. 5 shows how automatic quality of service optimization may be performed at the output side of an automatic, adaptive voice/data Ethernet device, in accordance with the principles of the present invention.

In particular, as shown in FIG. 5, in step 401 the output controller receives packets from output queues 105–105n.

In step 402, the output controller 107 determines whether the packet is high priority (e.g., a packet that is part of a voice stream).

Determining a packet's priority may be performed in a wide variety of ways. For example, the output controller 107 may search for a matching table entry in the QoS table 104. Preferably, the output controller 107 determines a packet's priority by noting from which output queue 105–105n the packet was received.

In step 405, if the packet is a high priority packet, i.e., a voice packet, then the output controller 107 forwards the packet to the transmit queue 108 for transmission to the next destination.

In step 403, if the packet is not a high priority packet, i.e., a low priority packet, then the output controller 107 calculates the packet's completion time.

Calculating a packet completion time may performed in wide variety of ways. Preferably, the packet completion time is calculated by multiplying the packet's length and the transmission rate and adding the result to the current clock value of clock 106.

In step 404, the output controller 107 determines if the packet completion time of the low priority packet is greater than a next expected arrival time of a high priority packet. Preferably, the output controller 107 compares the low priority packet completion time to the soonest value in the next arrival time column 206 of the QoS table 104.

In step 406, if the packet completion time of the low priority packet is greater than the next arrival time of the next high priority packet, (i.e., the low priority packet may interfere with the transmission of a high priority packet in a voice stream), then the low priority packet is held for a default or set period of time.

The amount of time a low priority packet is held may be set or defaulted to a wide variety of values. Preferably, the low priority packet is held until after the soonest next arrival time in column 206 passes.

After the low priority packet has been held, the output controller 107 repeats back to step 403 and calculates the packet completion time again.

In step 405, if the packet completion time of the low priority packet is less than the next arrival time of the next high priority packet (i.e., the low priority packet will not interfere with the transmission of a high priority packet), then the packet is forwarded to the transmit queue for transmission to the next destination.

Accordingly, the present invention provides automatic assignment of quality of service in an automatic, adaptive voice/data Ethernet device which provides the quality of service available in an explicitly-managed device, without requiring trained personnel to manually configure and maintain the device.

While the invention has been described with reference to the exemplary embodiments thereof, those skilled in the art will be able to make various modifications to the described embodiments of the invention without departing from the true spirit and scope of the invention.

What is claimed is:

1. An automatic adaptive voice/data device, comprising:
a high priority transmission queue;
a low priority transmission queue;
a data rate detector to detect a data rate of a data stream from a particular source; and
a periodicity detector to detect a periodicity between data packets from said particular source;
wherein data packets are provided to said high priority transmission queue and said low priority transmission queue based on their data rate and periodicity.

2. The automatic, adaptive voice/data device according to claim 1, wherein:
data packets having a data rate and periodicity each within a particular range associated with voice data are passed to said high priority transmission queue.

3. The automatic, adaptive voice/data device according to claim 1, wherein:
said automatic, adaptive voice/data device is an Ethernet compliant device.

4. The automatic, adaptive voice/data device according to claim 3, wherein:
particular source is identified based upon at least one of a source address and a destination address of said data stream.

5. The automatic, adaptive voice/data device according to claim 4, wherein:
said source address and said destination address are media access control addresses.

6. The automatic, adaptive voice/data device according to claim 4, wherein:
said source address and said destination address are Internet protocol addresses.

7. The automatic, adaptive voice/data device according to claim 4, wherein:
said source address and said destination address are transport control protocol ports.

8. A method of automatically assigning a quality of service in an automatic, adaptive voice/data device, comprising:
identifying a data flow from a particular source;
determining a data rate of said data flow;
determining a periodicity of a receipt of packets in said data flow; and
assigning a particular Quality of Service to said packets based on said data rate and periodicity.

9. The method of automatically assigning a quality of service in an automatic, adaptive voice/data device according to claim 8, wherein:
said step of assigning assigns packets to said particular Quality of Service having a data rate and periodicity associated with a voice stream.

10. The method of automatically assigning a quality of service in an automatic, adaptive voice/data device according to claim 9, further comprising:
tagging a packet within said data flow.

11. The method of automatically assigning a quality of service in an automatic, adaptive voice/data device according to claim 10, further comprising:
forwarding said tagged packet within said data flow in accordance with said particular Quality of Service.

12. The method of automatically assigning a quality of service in an automatic, adaptive voice/data device according to claim 9, further comprising:
identifying said data flow from said particular source is according to a source address and a destination address.

13. The method of automatically assigning a quality of service in an automatic, adaptive voice/data device according to claim 12, wherein:

said source address and said destination address are media access control addresses.

14. The method of automatically assigning a quality of service in an automatic, adaptive voice/data device according to claim 12, wherein:

said source address and said destination address are Internet protocol addresses.

15. The method of automatically assigning a quality of service in an automatic, adaptive voice/data device according to claim 12, wherein:

said source address and said destination address are transport control ports.

16. The method of automatically assigning a quality of service in an automatic, adaptive voice/data device according to claim 12, further comprising:

tagging said packet within said data flow according to a length of said packet.

17. The method of automatically assigning a quality of service in an automatic, adaptive voice/data device according to claim 9, wherein said step of assigning said particular Quality of Service comprises:

calculating a time difference between a last most recent packet arrival and a current clock value.

18. A method of optimizing a quality of service in an automatic, adaptive voice/data device, comprising:

identifying a high priority packet in a data flow based solely on a history of packets received from a same source;

calculating an expected next arrival time of a next high priority packet in said data flow;

determining whether a pending low priority packet will likely interfere with a transmission of said next high priority packet in said data flow; and forwarding said high priority packet in said data flow.

19. The method of optimizing a quality of service in an automatic, adaptive voice/data device according to claim 18, wherein:

said history of packets received comprises a data rate and periodicity of packets from said same source.

20. The method of optimizing a quality of service in an automatic, adaptive voice/data device according to claim 18, further comprising:

calculating a completion time of said pending low priority packet.

21. The method of optimizing a quality of service in an automatic, adaptive voice/data device according to claim 20, further comprising:

delaying transmission of said pending low priority packet when said completion time of said pending low priority packet exceeds said next arrival time of a next high priority packet in said data flow.

22. The method of optimizing a quality of service in an automatic, adaptive voice/data device according to claim 20, further comprising:

forwarding said pending low priority packet when said next arrival time of a next high priority packet in said data flow exceeds said completion time of said pending low priority packet.

* * * * *